United States Patent
Fontana, Jr. et al.

(10) Patent No.: US 6,259,583 B1
(45) Date of Patent: Jul. 10, 2001

(54) LAMINATED YOKE HEAD WITH A DOMAIN CONTROL ELEMENT

(75) Inventors: Robert Edward Fontana, Jr., San Jose; Yimin Hsu, Sunnyvale; Prakash Kasiraj; Mason Lamar Williams, both of San Jose, all of CA (US)

(73) Assignee: International Business Machines, Corporation, Armonk, NY (US)

(*) Notice: Subject to any disclaimer, the term of this patent is extended or adjusted under 35 U.S.C. 154(b) by 0 days.

(21) Appl. No.: 09/154,527

(22) Filed: Sep. 16, 1998

(51) Int. Cl.$^7$ .......................... G11B 5/147; G11B 5/187
(52) U.S. Cl. .................................................. 360/126
(58) Field of Search .................................... 360/126, 317

(56) References Cited

U.S. PATENT DOCUMENTS

| | | | |
|---|---|---|---|
| 3,639,699 | 2/1972 | Tiemann | 179/100.2 C |
| 3,867,368 | 2/1975 | Lazzari | 360/126 |
| 4,610,935 | 9/1986 | Kumasaka et al. | 428/632 |
| 4,860,139 * | 8/1989 | Hamilton | 360/126 |
| 4,951,166 * | 8/1990 | Schewe | 360/126 X |
| 5,018,038 | 5/1991 | Nakanishi | 360/126 |
| 5,027,246 * | 6/1991 | Numazawa et al. | 360/126 |
| 5,108,837 | 4/1992 | Mallary | 428/336 |
| 5,113,300 * | 5/1992 | Ikeda et al. | 360/126 |
| 5,132,859 | 7/1992 | Andricacos et al. | 360/113 |
| 5,142,426 | 8/1992 | Re et al. | 360/126 |
| 5,155,646 * | 10/1992 | Fujisawa et al. | 360/126 |
| 5,157,570 | 10/1992 | Shukovsky et al. | 360/126 |
| 5,224,002 | 6/1993 | Nakashima et al. | 360/126 |
| 5,239,435 | 8/1993 | Jeffer et al. | 360/126 |
| 5,264,981 | 11/1993 | Campbell et al. | 360/126 |
| 5,313,356 | 5/1994 | Ohkubo et al. | 360/126 |
| 5,325,254 * | 6/1994 | Cooperrider | 360/126 |
| 5,379,172 * | 1/1995 | Liao | 360/126 |
| 5,473,491 * | 12/1995 | Fujisawa et al. | 360/126 |
| 5,576,098 | 11/1996 | Arimoto et al. | 428/332 |
| 5,576,099 | 11/1996 | Canaperi et al. | 428/332 |
| 5,590,008 | 12/1996 | Tanabe et al. | 360/126 |
| 5,606,478 | 2/1997 | Chen et al. | 360/126 |
| 5,880,915 * | 3/1999 | Lee et al. | 360/126 |
| 5,940,253 * | 8/1999 | Mallary et al. | 360/126 |
| 6,055,137 * | 4/2000 | Ishiwata et al. | 360/126 X |

OTHER PUBLICATIONS

Nakamura, Y. et al. Analysis of domain structure of single pole perpendicular head, IEEE. Trans. Mag., 21(5), pp. 1578–1580, 1985.

Lazzari, J.et al, Integrated magnetic recording heads, IEEE Trans. Mag., 7(1), pp. 146–150, 1971.

* cited by examiner

*Primary Examiner*—William Klimowicz
(74) *Attorney, Agent, or Firm*—Lumen Intellectual Property Services

(57) ABSTRACT

The present invention is a magnetic head which has a preferably planar pole member having a yoke and a tip with a first planar pole P1 and a second planar pole P2 positioned above pole P1. The pole member is built up of two types of layers: a first type of layer with high magnetic permeability $\mu$ and low anisotropy $H_k$, with the easy axis oriented substantially perpendicular to the flux propagation direction to ensure rapid response, and a second layer type which is non-magnetic. The magnetic head also has a domain control element whose magnetization in the vicinity of the pole tip P2 and in the absence of applied field is aligned along the length of the element so as to facilitate the conduction of flux between poles P1 and P2. The domain control element can be a non-laminated element made of a material with high saturation magnetization $M_S$ such as NiFe, $Ni_{80}Fe_{20}$, $Ni_{45}Fe_{55}$, NiFeCo, FeCo, CoZrNb, FeAlN and FeTaN and proper dimensioning of the element further increases the flux conduction efficiency.

15 Claims, 7 Drawing Sheets

LAMINATED YOKE HEAD WITH A DOMAIN CONTROL ELEMENT

FIELD OF THE INVENTION

This invention relates generally to an inductive magnetic recording head, and in particular to a head with a laminated yoke equipped with a domain control element for improving the overall performance of the head.

BACKGROUND OF THE INVENTION

Advances in magnetic storage technology require that data rates and especially data write times be reduced. This means that a typical magnetic storage device employing a read-head to read data from and write data to a magnetic medium, e.g., a disk or a tape, has to improve the efficiency of the head. In particular, the rate at which data is written has to be increased, since write and read data rates are the same.

The head is usually formed from two or more elongated pieces of a suitable ferromagnetic material such as a nickel iron (NiFe) alloy. The poles are joined at one end, called the yoke, and separated by a precisely defined gap at the opposite end called the tip. A coil is wrapped around the poles near the yoke. During operation the head is positioned with the tip adjacent the magnetic medium. Data is written to the magnetic medium by driving magnetic flux into the head by passing a write current through the coil. When reading data, the coil senses magnetic flux from the head by generating a read current. The electromagnetic parameters governing the behavior of such heads dictate that the yoke be wide to increase magnetic flux passing through the coil and that the tip be narrow to accommodate high data track density in the magnetic medium.

At high track densities the magnetic properties of the materials used in the poles become crucial. Specifically, what is required is a pole material exhibiting a high magnetic permeability $\mu$ and low magnetic coercivity $H_c$. Since $$\mu = \frac{4\pi M_S}{H_k},$$

where $M_S$ is the magnetization at saturation and $H_k$ is the anisotropy magnetic field, a high $\mu$ suggests a choice of $H_k$ as small as possible. However, it has been shown by Nakamura, et al., IEEE Trans. Mag. 21(5), 1985 that too low an anisotropy results in undesirable magnetic domain patterns in narrow pole tips. However, increasing $H_k$ to a high value has the adverse effect of decreasing the reproducing sensitivity because of reduced $\mu$.

The prior art suggests that the above problem be solved by using laminated poles which combine beneficial magnetic properties of two materials. For example, in U.S. Pat. No. 3,639,699 Tiemann discloses a thin film structure of permalloy with a high $\mu$ and a second magnetic material with low $\mu$ and high MS. Lazzari teaches in U.S. Pat. No. 3,867,368 to use an additional decoupling layer between laminations of high $\mu$ and low $\mu$ materials to eliminate exchange coupling between them. Lazzari et al. further explain in "Integrated Magnetic Recording Heads", IEEE Trans. Mag., Vol. MAG-7, No. 1, March 1971 that obtaining single domain behavior in laminated poles is desirable for efficient operation of the read-head.

The problems associated with the use of laminated poles include domain stability, material composition, reduction of eddy currents, proper dimensioning and parametrization of the magnetic properties of the layers (e.g., determination of the easy magnetization or fast axis and minimization of edge domains). These general problems are addressed by Nakanishi in U.S. Pat. No. 5,018,038; Andricacos et al. in U.S. Pat. No. 5,132,859; Re et al. in U.S. Pat. No. 5,142,426; Shukovsky et al. in U.S. Pat. No. 5,157,570; Campbell et al. in U.S. Pat. No. 5,264,981; Jeffers et al. In U.S. Pat. No. 5,239,435; Ohkubo et al. in U.S. Pat. No. 5,313,356 and Arimoto et al. in U.S. Pat. No. 5,576,098. Additional patents addressing laminated poles include U.S. Pat. No. 4,610,935; U.S. Pat No. 5,108,837; U.S. Pat. No. 5,224,002; U.S. Pat. No. 5,576,099 and U.S. Pat. No. 5,606,478.

Although the teachings of the above references do solve many intervening problems and make laminated poles more efficient, they fall short of presenting a head capable of high speed writing. That is because in most of the yoke the magnetic flux runs substantially parallel to the magnetic lamina, but in the tip, specifically at the gap, the flux is generally perpendicular to the lamina. As a result, there is a magnetomotive force drop across the accumulation of non-magnetic layers which reduces the efficiency of the head. Even when using high $\mu$ materials (relative $\mu$=1,000) the effective average permeability perpendicular to the lamina in which a fraction f of total thickness is made of magnetic material will be at maximum at about $1/(1-f)$. As a result, excessively high write currents are required for such heads.

U.S. Pat. No. 5,590,008 to M. Tanube et al. teaches that the upper pole may include two or more layers and a metal may be placed in the gap between the poles. This arrangement will aid in reducing the write current to some extent. In addition, Harry Gill in "CoHfNb/Al$_2$O$_3$ Laminated Write Pole for an Integrated Spin Valve Giant Magnetoresistive Read Inductive Head", IBM Technical Disclosure Bulletin, Vol. 40, No. 4, April 1997 teaches to improve the write efficiency at high frequencies by using a high electrical resistivity, non-laminated write pole made of a Co-based amorphous alloy to further reduce eddy currents.

Unfortunately, a problem not solved by the addition of a non-laminated pole portion at the tip or placement of metal in the gap between poles is the alignment of domain magnetizations at the narrow end of the pole in the tip. Specifically, for efficient operation the domains in the tip should have a tendency to align along the easy or fast axis of the high $\mu$ layers. However, edge effects at high frequencies prevent this from happening. Additionally, all prior art laminated heads have at least one non-planar pole for accommodating the coil. This geometry negatively affects the magnetic properties of the head because it interferes with efficient conversion of current to magnetic flux in high $\mu$ layers and vice versa.

OBJECTS AND ADVANTAGES

Accordingly, it is a primary object of the present invention to provide a magnetic head with improved writing performance at high operating frequencies and high data densities. In particular, the head of the invention achieves better writing performance by preventing undesirable edge effects from interfering with the writing process.

Another object of the invention is to improve the magnetic properties of the magnetic head by altering the geometry of the head to provide for efficient conversion of current to magnetic flux and vice versa.

Yet another object of the invention is to optimize the number and thickness of laminated non-magnetic layers in the head.

It is also an object of the invention to ensure simple fabrication of magnetic heads exhibiting improved performance.

These and other advantages of the invention will become apparent upon reading the detailed description.

SUMMARY

These objects and advantages are attained by a magnetic head which has a pole member, which is preferably planar, and has a yoke and a tip. The tip has a first planar pole P1 and a second planar pole P2 positioned above pole P1. The pole member is built up of two types of layers: a first type of layers with high magnetic permeability $\mu$ and low anisotropy $H_k$, with the easy axis oriented substantially perpendicular to the flux propagation direction to ensure rapid response, and a second layer type which is non-magnetic. The magnetic head also has a domain control element which is positioned at the tip. The function of the domain control element is to conduct flux between P1 and P2 in a fast, efficient manner. For this purpose, the domain control element has its magnetization (in the absence of current in the head coil) in the vicinity of pole tip P2 aligned along the length of the domain control element, which provides for rapid rotation.

It is preferable that the domain control element be a non-laminated element made of a material with high saturation magnetization $M_S$. Suitable materials include alloys such as NiFe, $Ni_{80}Fe_{20}$, $Ni_{45}Fe_{55}$, NiFeCo, FeCo, CozrNb, FeAlN and FeTaN.

The non-laminated element can be mounted on the first pole P1 or on the second pole P2. Preferably, when first pole P1 is wider the non-laminated element is mounted on it. For proper domain control the non-laminated element is at least two times wider than the width of the second pole P2. Also, when the tip has a throat height t, the non-laminated element should have a width equal to at least twice t.

Alternatively, the domain control element can include two separate non-laminated elements; one mounted on the first pole P1 and one mounted on the second pole P2. The requirements regarding magnetization saturation and materials are the same as in the case of a single non-laminated element. Furthermore, the second non-laminated element should be the width of second pole P2.

The head of the invention can be used for writing data in data tracks of a magnetic medium, e.g., in a disk or tape. In this application the domain control element or elements should include at least one non-laminated element whose width is at least two times larger than the track width.

The invention will be better understood upon reading the following detailed description which makes reference to the attached drawing figures.

DETAILED DESCRIPTION

A preferred embodiment of a magnetic head 10 and its salient features are shown in FIGS. 1–5. As illustrated in the perspective view of FIG. 1, head 10 has a laminated pole member 12 consisting of a first or bottom pole 14, also referred to as P1, and a second or top pole 16, referred to as P2. In contrast to prior art pole members, poles P1 and P2 are planar parallel and are joined at their wide or yoke portions 18, 20 by an electrically conductive yoke element 22.

Head 10 has an active end or tip 24 opposite yoke element 22. Pole P1 has a wide pole tip 26; in fact, pole P1 has the same width at tip 24 and yoke 22, i.e., pole P1 is essentially rectangular. Meanwhile, pole P2 tapers down from the same width as pole P1 at its yoke portion 20 to form a narrow pole tip 28 at tip 24. As usual, the width of pole tip 28 defines the track width. In contrast, the width w of pole P1 is substantially larger than the track width (see FIG. 3), e.g., twice to three times wider than width w of pole P1.

Figure 1:
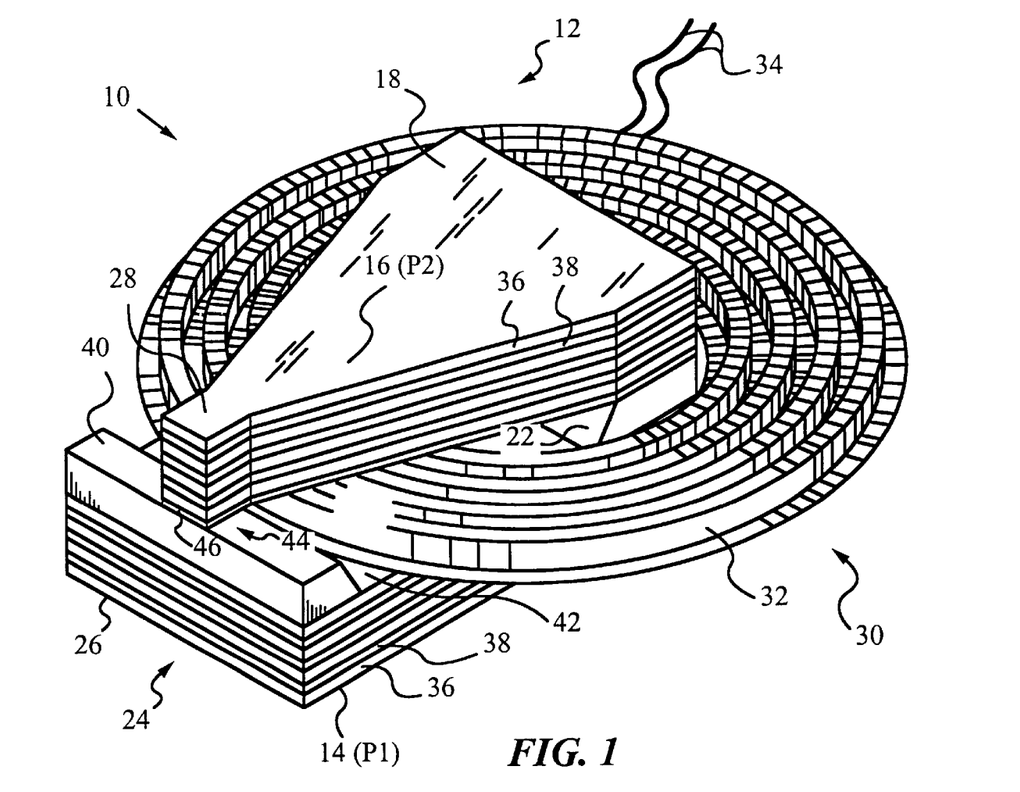
FIG. 1 is an isometric view of a magnetic head with a laminated pole structure according to the invention.

A coil 30 consisting of a number of windings 32 wraps around yoke element 28. A pair of leads 34 from coil 30 are provided for delivering a current to coil 30. Leads 34 serve to deliver a current to coil 30 and for receiving a current from coil 30. Coil 30 is positioned such that the magnetic flux generated by the read current is efficiently coupled into poles P1 and P2 via yoke portions 18, 20 and yoke element 22. Also, during reading the flux passing through yoke portions 18, 20 and yoke element 22 is thus efficiently converted to a read current in coil 30.

Poles P1 and P2 consist of a number of layers falling into two categories or types. A first type of layers 36 have a high permeability $\mu$ and a low anisotropy $H_k$. A number of a second type layers 38 are substantially non-magnetic. The first and second type layers 36, 38 alternate. Preferably, the thickness of the second type of layers 38 ranges from 25 to 50 Angstroms.

Further, at tip 24 of head 10 there is a domain control element 40 or a throat defining structure. In the preferred embodiment element 40 is attached to pole P1 on its top surface 42 and extends along the full width w of pole tip 26 of pole P1. Element 40 is a non-laminated part made of a material with high saturation magnetization $M_S$ ranging from 1 to 2.4 Tesla. Suitable alloys for element 40 include $Ni_{80}Fe_{20}$, $Ni_{45}Fe_{55}$, NiFeCo, FeCo, CoZrNb, FeAlN and FeTaN.

Figure 2:
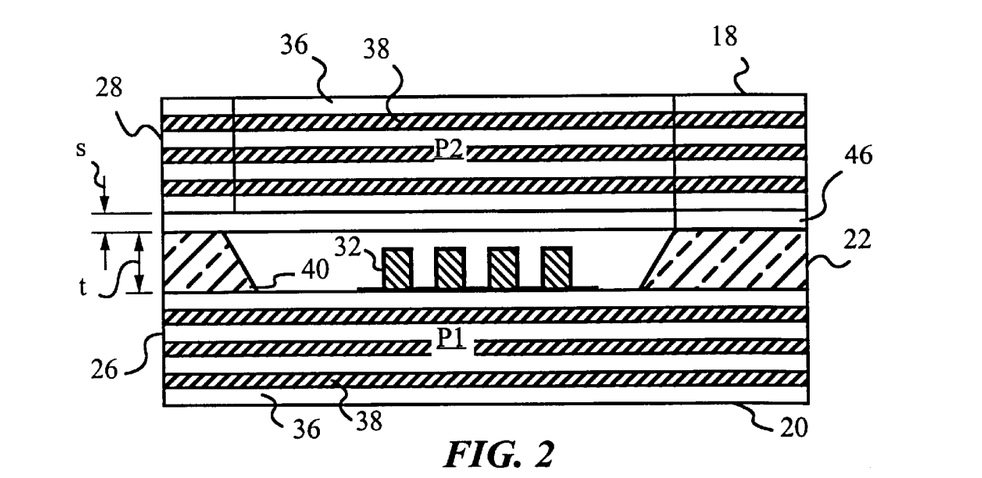
FIG. 2 is a cross sectional view of the front portion of the magnetic head of FIG. 1.

Referring now to the cross sectional view of FIG. 2 in which the dimensions are not drawn to scale, a write gap 44 of thickness s is created between element 40 and top pole P2. A layer 46 of non-magnetic material fills gap 44. The thickness t of element 40 is such that the total thickness of layers 38 in each pole P1, P2 represents less than 15% of the thickness s of gap 44. In any event, however, it is preferable that the total thickness of layers 38 be kept at less than 30% of the thickness s of write gap 44. For example, thickness s of write gap 44 can be approximately 0.1 $\mu$m while the total thicknesses of poles P1 and P2 may range from 1–3 $\mu$m of which the total thickness of layers 38 is only 30 nm.

Figure 3:
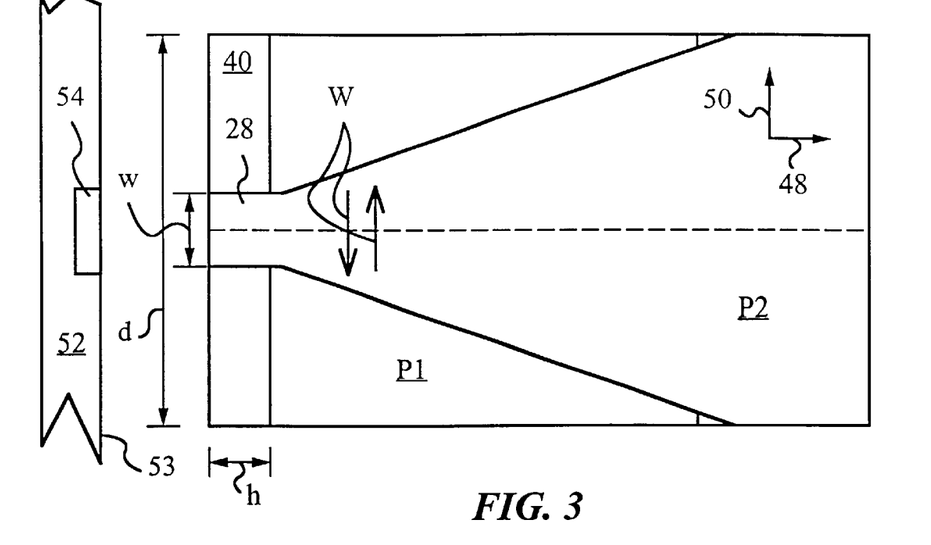
FIG. 3 is a top plan view illustrating the magnetic properties of the top pole P2 of the magnetic head from FIG. 1.

Referring to the top view of FIG. 3, the width d of element 40 is equal to the width w of pole P1. The height h of element 40, also referred to as throat height, should be 0.25 to 1.0 $\mu$m. Moreover, the width d and height h of element 40 are no more than three times the skin depth of the material of which element 40 is made at the required operating data rate of head 10. Similarly, the thickness of layers 36 does not exceed three times the skin depth of the material making up layers 36 and 38 at the operating rate of head 10. A person of average skill in the art will be able to determine the skin depth based on prior art teachings.

The top view of FIG. 3 indicates a hard axis 48 and an easy axis 50 defining the magnetic anisotropy $H_k$ of layers 36. Arrows W indicate the preferred direction of magnetization of magnetic domains in pole tip 28 of pole P2 and, in fact, throughout pole P2. With no write current applied to coils 32 the magnetization vectors of the magnetic domains in pole tip 28 should be aligned with easy axis 50. This increases the speed of magnetization reversal required for writing in a magnetic medium 52, and specifically for causing data to be written in a data track 54 of medium 52. As is well-known, this process occurs while head 10 flies over a surface 53 of medium 52.

The flux propagation through element 40 is primarily perpendicular to gap 44 and it is for this reason that element 40 is a non-laminated piece.

Figure 4:
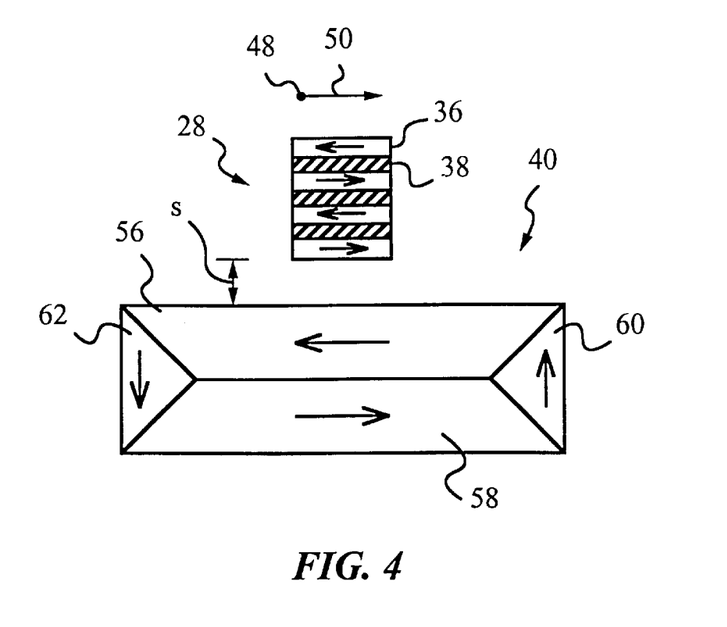
FIG. 4 is an enlarged cross sectional view illustrating typical magnetization directions in the narrow pole tip and the domain control element when the current in the head coil is zero.

Element 40 has two major magnetic domains 56, 58 whose magnetization vectors are aligned parallel to fast axis 50. At the edges, element 40 has two edge or fringe domains 60, 62 in which the magnetization vectors are perpendicular to fast axis 50. This advantageous condition, in which fringe domains of undesirable magnetization are far away from and do not influence favorable magnetization alignment in layers 36 of pole tip 28 is achieved and maintained because of the above-described dimensions and composition of element 40. In particular, it is important that element 40 be at least twice the width of pole tip 28 to preserve this condition. As an additional advantage the height h of element 40 also helps to spread out the flux over a large area before entry into pole P1. This, in turn, reduces the reluctance of layers 38 in pole P1.

Figure 5:
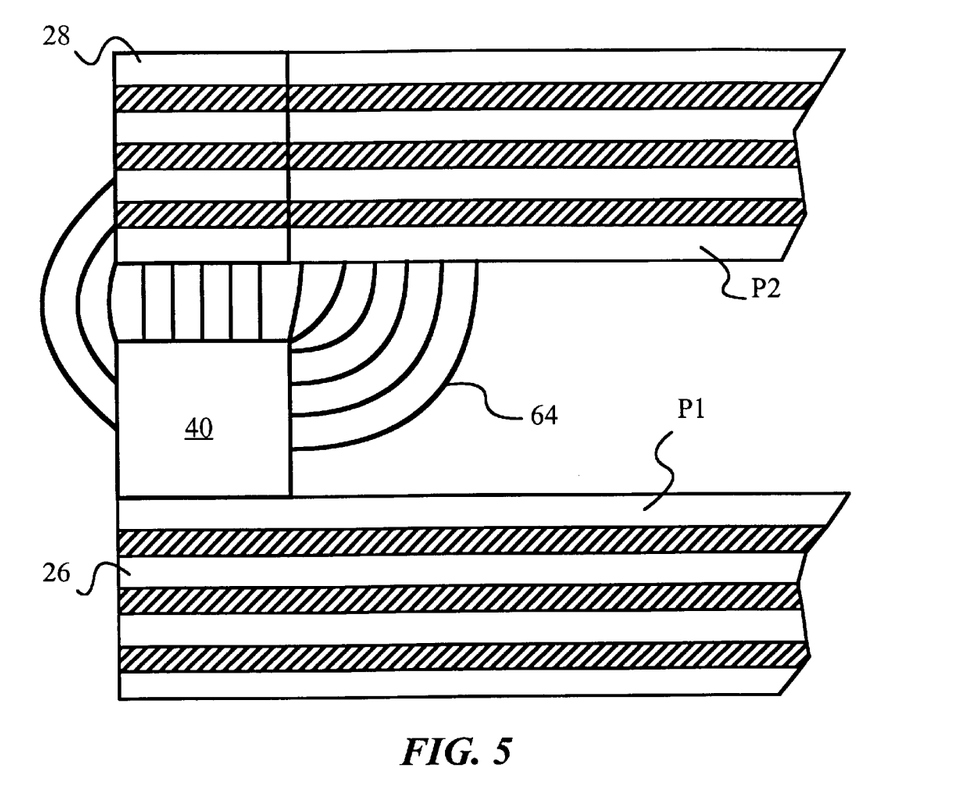
FIG. 5 is an enlarged cross sectional side view of the tip of the magnetic head of FIG. 1 showing the magnetic field lines at the tip.

Another advantage of head 10 is illustrated in FIG. 5. The magnetic flux lines are designated by reference 64. Between pole tips 28 and 26 flux lines 64 run essentially parallel and enter element 40 at a right angle. Flux lines 64 exiting pole P2 away from pole tip 28 undergo a progressively more defined bending or fringing along their path before entering element 40. In fact, the bending angle or the apex angle of field lines 64 quickly approaches 90°. That is due to the parallel and planar geometry of poles P1 and P2. In contrast, prior art devices exhibit apex angles of approximately 20° and thus do not permit a wide separation between poles P1 and P2 achieved by the present invention. Furthermore, the present design reduces flux shunting in the gap thus raising efficiency.

Figure 6A:
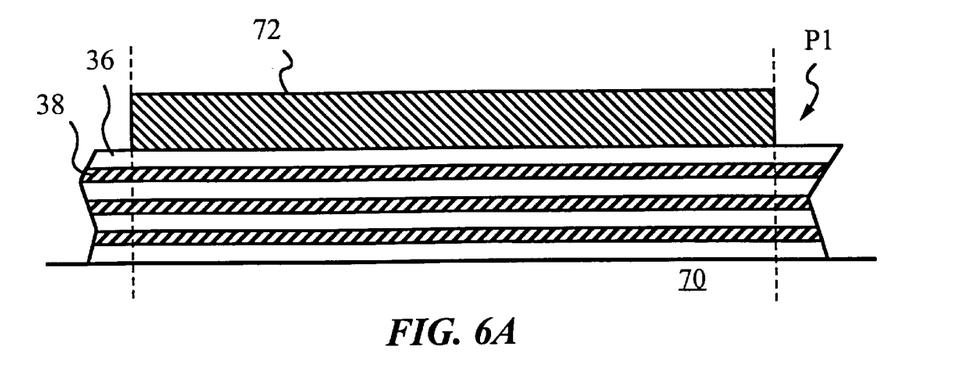
FIGS. 6A–M are cross sectional side views illustrating the process of making a magnetic head according to the invention.
Figure 6B:
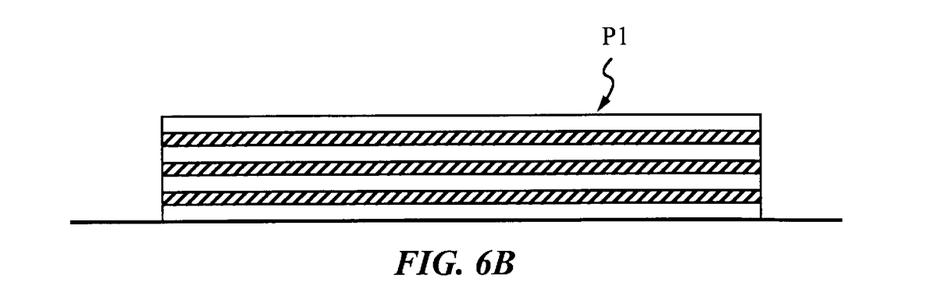

The steps involved in making head 10 as shown in FIG. 4 are illustrated in the cross sectional side views of FIGS. 6A–M. It will be appreciated by a person of average skill in the art that there are other methods of making head 10 and that this process is merely illustrative. In particular, one or both of layers of bottom pole 14 or P1 and top pole P2 or 16 may be non-laminated, i.e., formed of one flux conductive material However, independent of the process employed, it is very important that pole P1 be well planarized before producing pole P2. This is accomplished by chemical mechanical planarization (CMP) at several steps in the present processing sequence. FIG. 6A illustrates the first two steps in which layers 36 and 38 of pole P1 are deposited on a substrate 70. A lithographic resist mask 72 is then used to define the shape of pole P1. In the preferred embodiment the shape of pole P1 is rectangular, but other shapes are also admissible. The resulting pole P1 obtained after removing mask 72 is shown in FIG. 6B.

Figure 6C:
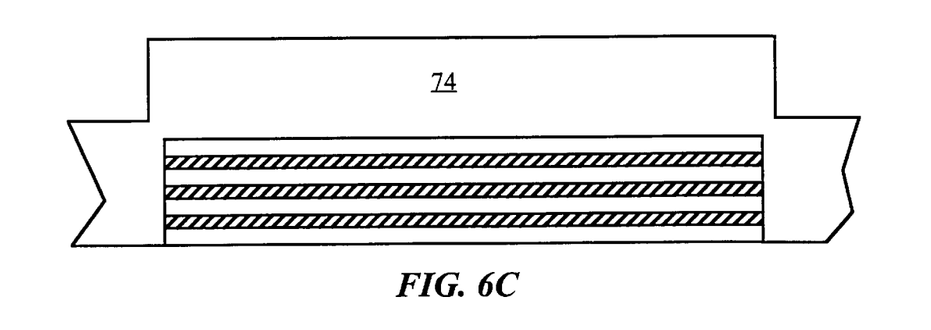
Figure 6D:
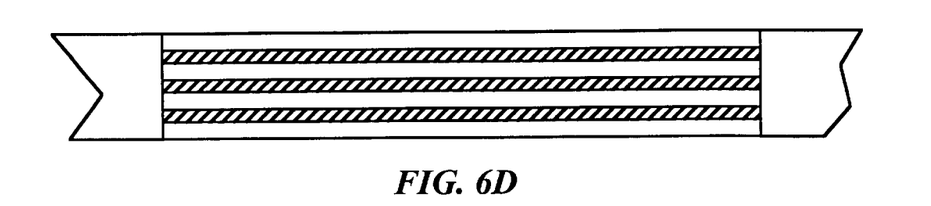

Next, an insulator 74 such as alumina or SiO is deposited on pole P1 to a thickness slightly greater than the thickness of pole P1, as shown in FIG. 6C. A CMP step follows to ensure proper planarity of pole P1. The resulting planarized pole P1 is shown in FIG. 6D.

Figure 6E:
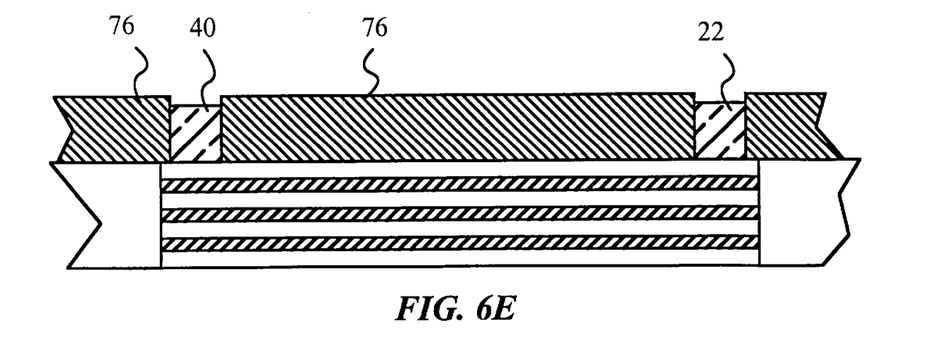
Figure 6F:
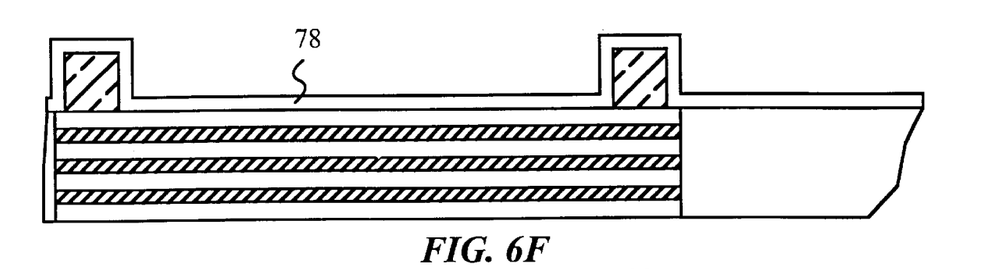
Figure 6G:
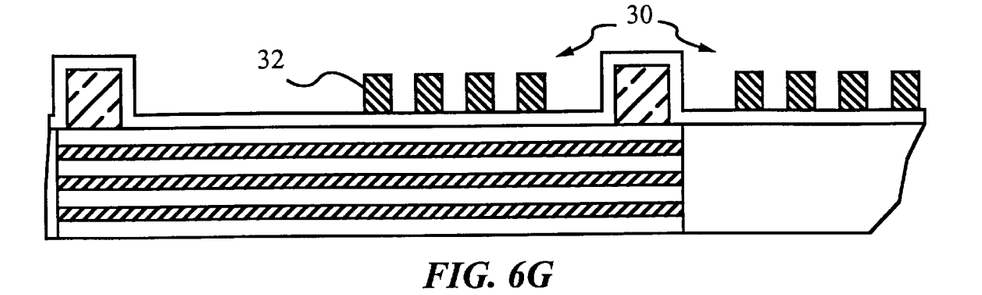

Element 40 and yoke element 22 are plated on top of P1 in structures defined by a resist mask 76, as shown in FIG. 6E. After removing resist 76 an insulating layer 78 is deposited on top of pole P1 (FIG. 6F) and windings 32 of coil 30 are formed by lithography and plating (FIG. 6F).

Figure 6H:
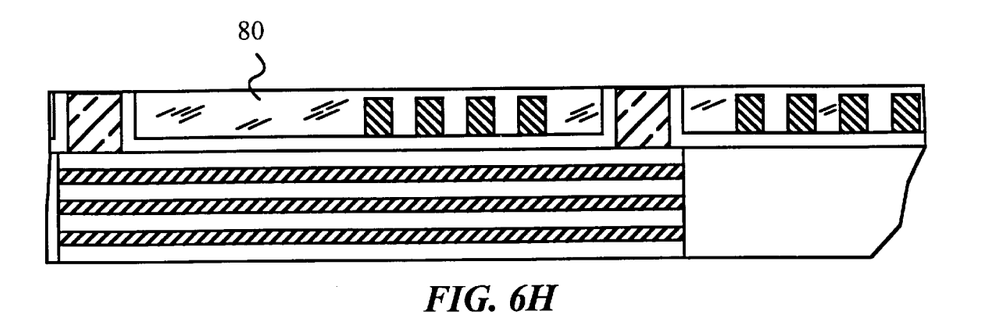

After formation of coil 30 an insulator 80, e.g., alumina, is deposited on top of pole P1 and a planarization step by CMP is performed. FIG. 6H shows pole P1 after planarization. The tops of element 40 and yoke element 22 are exposed.

Figure 6I:
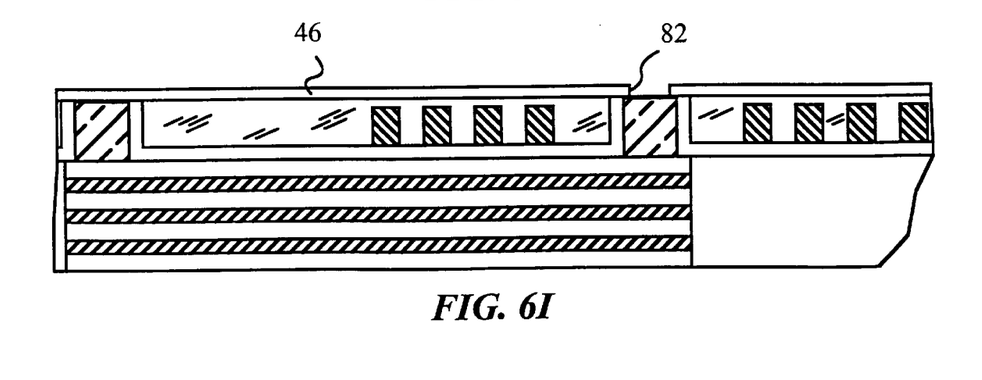
Figure 6J:
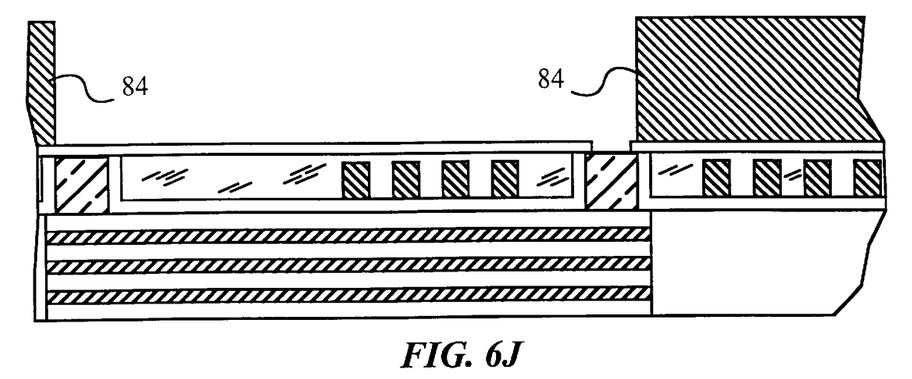
Figure 6K:
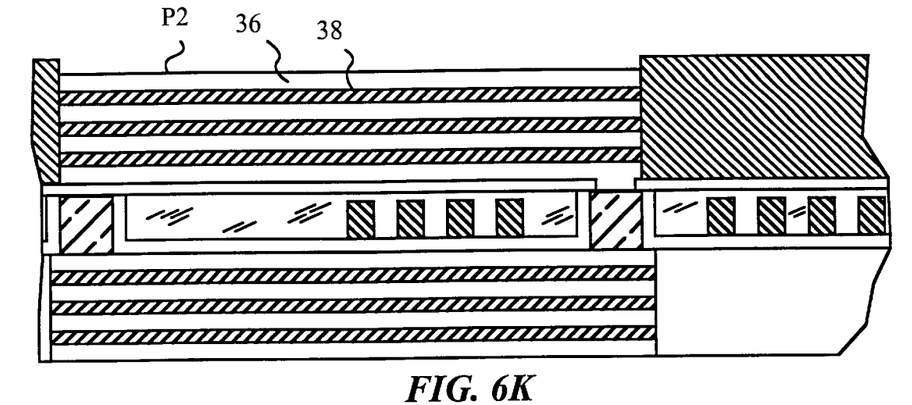

In the next step, illustrated in FIG. 6I, write gap layer 46 is deposited and a through opening 82 is provided for electrical contact over yoke element 22. Then, a resist mask 84 is deposited on the planar surface (FIG. 6J) and layers 36, 38 of top pole P2 are deposited by lithography and plating.

Figure 6L:
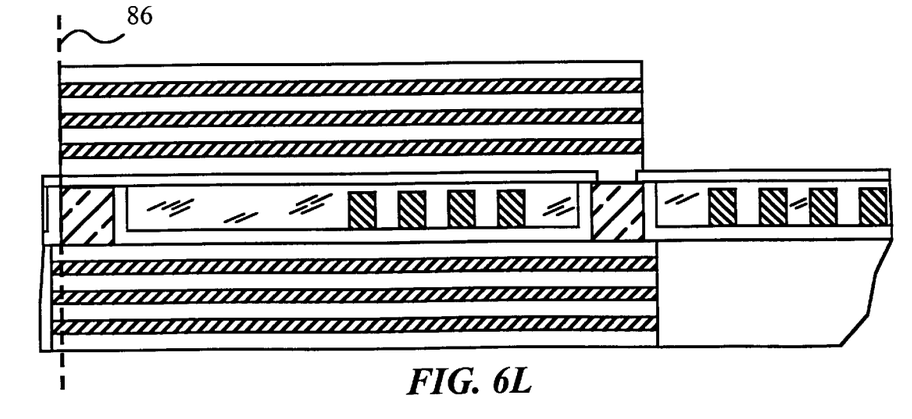
Figure 6M:
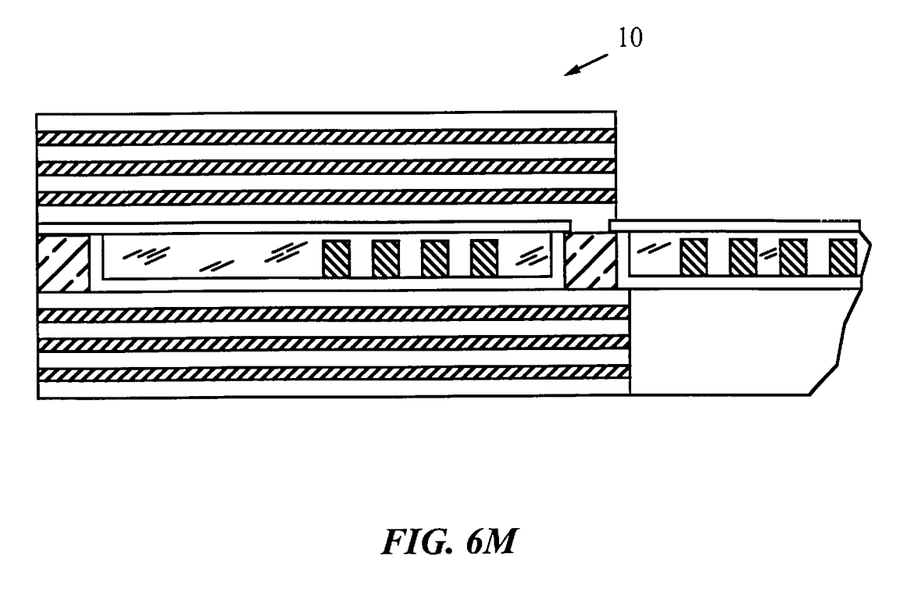

Finally, resist 84 is removed and the structure is lapped to an ABS height as indicated by dashed line 86 in FIG. 6L. Finished magnetic head 10 is shown in FIG. 6M.

Magnetic head 10 produced according to this simple fabrication method can be operated at high operating frequencies and high data densities. In particular, head 10 achieves better writing performance by preventing undesirable edge effects from interfering with the writing process.

It will be clear to one skilled in the art that the above embodiment may be altered in many ways without departing from the scope of the invention. Accordingly, the scope of the invention should be determined by the following claims and their legal equivalents.

What is claimed is:

1. A magnetic head comprising:
   a) a yoke;
   b) a first planar pole and a second planar pole parallel to said first pole;
   c) each of said first and second poles including one or more flux-conductive layers having high permeability $\mu$ and low anisotropy $H_k$;
   said magnetic head further comprising:
   a) a coil between said first pole and said second pole for creating an applied magnetic field; and
   b) a domain control means positioned at a tip of said magnetic head for facilitating the conduction of flux between said first pole and said second pole, wherein said domain control means is at least two times wider than a tip of said second pole.

2. The magnetic head of claim 1 wherein said second planar pole is laminated.

3. The magnetic head of claim 1 for writing in a magnetic medium having a surface, wherein said domain control means has an anisotropic shape to cause the magnetization in said first pole and said second pole to be substantially parallel to said surface in the absence of said applied magnetic field.

4. The magnetic head of claim 3 wherein said domain control means comprises a non-laminated element.

5. The magnetic head of claim 4 wherein said non-laminated element comprises a material of saturation magnetization $M_S$ ranging from 1 to 2.4 Tesla.

6. The magnetic head of claim 4 wherein said non-laminated element is made of a material selected from the group consisting of $Ni_{80}Fe_{20}$, $Ni_{45}Fe_{55}$, NiFeCo, FeCo, CoZrNb, FeAlN and FeTaN.

7. The magnetic head of claim 4 wherein said non-laminated element is mounted on said first pole or on said second pole.

8. The magnetic head of claim 4 wherein each of said first and second pole pieces includes one or more non-magnetic layers, wherein a gap width is formed between said non-laminated element and said second planar pole and the thickness of said one or more non-magnetic layers is less than 15% of said gap width.

9. The magnetic head of claim 1, wherein each of said first and second poles includes one or more non-magnetic layers.

10. The magnetic head of claim 9 wherein a gap width is formed between said domain control means and said second planar pole and the thickness of said one or more non-magnetic layers is less than 15% of said gap width.

11. A magnetic head for writing data in a magnetic medium having data tracks, said magnetic head comprising:
   a) a yoke;
   b) a first planar pole and a second planar pole parallel to said first planar pole;
   c) each of said first and second poles including one or more flux-conductive layers having high permeability $\mu$ and low anisotropy $H_k$;
   d) each of said first and second poles including one or more non-magnetic layers;

said magnetic head further comprising a domain control means positioned at a tip of said magnetic head for facilitating the conduction of flux between said first pole and said second pole, wherein said data tracks are spaced by a track width and said domain control means has a width at least two times larger than said track width.

12. The magnetic head of claim 11 wherein said second planar pole is laminated.

13. The magnetic head of claim 11 wherein said domain control means comprises a non-laminated element.

14. The magnetic head of claim 13 wherein a gap width is formed between said non-laminated element and said second planar pole and the thickness of said one or more non-magnetic layers is less than 15% of said gap width.

15. The magnetic head of claim 11 wherein a gap width is formed between said domain control means and said second planar pole and a total thickness of said one or more non-magnetic layers in each of said first and second pole nieces is less than 15% of said gap width.

* * * * *

UNITED STATES PATENT AND TRADEMARK OFFICE
CERTIFICATE OF CORRECTION

PATENT NO. : 6,259,583 B1 Page 1 of 1
DATED : July 10, 2001
INVENTOR(S) : Robert Edward Fontana Jr. et al.

It is certified that error appears in the above-identified patent and that said Letters Patent is hereby corrected as shown below:

<u>Title page,</u>
Item [75], Inventors, insert after "all of CA (US)" the following:

-- Hugo Alberto Emilio Santini of San Jose, CA --

Signed and Sealed this

Twentieth Day of August, 2002

Attest:

JAMES E. ROGAN
Attesting Officer Director of the United States Patent and Trademark Office